United States Patent
Womack

(10) Patent No.: US 6,837,714 B2
(45) Date of Patent: Jan. 4, 2005

(54) CHORE BUDDY

(75) Inventor: Jean Ione Womack, Forest Lake, MN (US)

(73) Assignee: Jean I. Womack, Forest Lake, MN (US)

(*) Notice: Subject to any disclaimer, the term of this patent is extended or adjusted under 35 U.S.C. 154(b) by 0 days.

(21) Appl. No.: 10/090,162

(22) Filed: Apr. 30, 2002

(65) Prior Publication Data

US 2003/0203345 A1 Oct. 30, 2003

(51) Int. Cl.⁷ .............................................. G09B 19/00
(52) U.S. Cl. ....................................................... 434/238
(58) Field of Search ................................ 434/236, 237, 434/238, 81, 84, 168, 107, 108; 40/124.04, 449, 600; 273/239

(56) References Cited

U.S. PATENT DOCUMENTS

| | | | | |
|---|---|---|---|---|
| 2,883,765 A | * | 4/1959 | Blaine | 434/238 |
| 3,035,355 A | * | 5/1962 | Holmes | 434/238 |
| 3,782,009 A | * | 1/1974 | Darnell | 434/238 |
| 5,375,351 A | * | 12/1994 | King et al. | 40/124.04 |
| 5,573,405 A | * | 11/1996 | Evans | 434/238 |
| 5,577,915 A | * | 11/1996 | Feldman | 434/238 |
| 5,639,242 A | * | 6/1997 | Wilson | 434/238 |
| 6,010,338 A | * | 1/2000 | Watson | 434/81 |
| 6,345,821 B1 | * | 2/2002 | Labrot | 273/236 |
| 6,354,030 B1 | * | 3/2002 | Harris | 40/711 |

* cited by examiner

Primary Examiner—Kurt Fernstrom

(57) ABSTRACT

Magnetic device for use of dispensing and tracking househould or business duties.

A piece of magnetic sheet martial, that may be placed on a metal surface, you also have smaller pieces of the same material with chores or duties pre-printed on them, when you want someone to do a specific chore you place that small square on the large sheet under the heading "Please do" as that chore is completed the person moves it to the area that says "Thank You" each chore or job is color coded depending on the category of job. The large magnetic piece can have printing on it for a advertising promotion or can be decorated using craft materials, for use in the home or office.

3 Claims, 1 Drawing Sheet

//CHORE BUDDY

BRIEF SUMMARY OF THE INVENTION

Broadly stated this invention is a product that will help adults to instruct children or house keepers about what is expected of them per their daily chores and to track there completion, by way of a magnetic sheet placed on a metal surface.

BRIEF DESCRIPTION OF VIEWS OF DRAWINGS

DETAILED DESCRIPTION OF INVENTION

Figure 1:
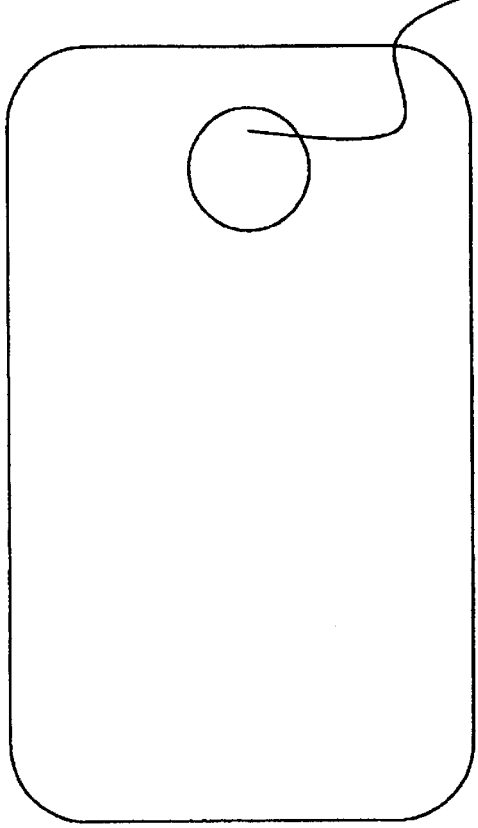
FIG. 1 is the front of the invention known as the backing board to the invention.

Referring to FIG. 1, this invention comprises a board 1 made of flat white magnetic sheet material, to be placed on a metal surface like a refrigerator door. It acts as a backing piece to which the small magnetic discs 2 of FIG. 2 will be placed. FIG. 1 can be decorated with stickers, markers, paints, etc. There is a hole sized and adapted to receive a person's picture 4 made in the board 1 of FIG. 1 and, once purchased, a persons picture is placed in that hole, that represents the person who belongs to that "Chore Buddy" and responsible for those chores. This portion of the invention can be of any geometrical shape or size larger than the magnetic discs of FIG. 2.

Figure 2:
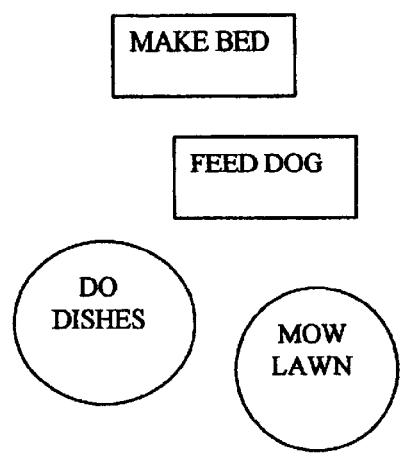
FIG. 2 is the front of the invention known as the small pieces with the household chore written on each. 4 Examples are shown. All these little phrases are separated.
Figure 3:
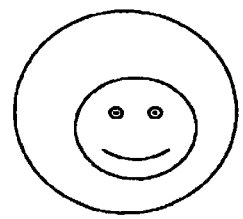
FIG. 3 is a picture of a person which is used in conjunction with the chore system.

Referring to FIG. 2, this part of the invention is a bunch of magnetic discs 2 smaller than the board and adapted to be placed on the board made of the same magnetic sheeting, each having a specific household chore written on it. When a chore is requested to be done, that small piece is placed on top ½ of FIG. 1. When that chore is completed the little piece is moved to the bottom ½ of FIG. 1. These pieces can be made of any geometrical size or shape smaller than that of FIG. 1

This is a system to instruct people to do daily chores when you are not there to give the instructions, it allows the tracking of completed chores.

The embodiments of the invention in which an exclusive property or privilege is claimed are defined as follows:

1. A chore system comprising:
   a board of magnetic sheet material adapted to be placed on a metal surface;
   a plurality of magnetic discs smaller than the board and adapted to be placed on the board, wherein each disc has a specific chore written thereon; and
   a picture of a person, wherein the board further comprises a hole sized and adapted to receive the picture such that when the board is placed on a metal surface, the picture is visible through the hole.

2. The chore system of claim 1, wherein the board is white, and capable of receiving stickers, markers and paint thereon.

3. The chore system of claim 1, wherein the magnetic discs comprise a plurality of geometric shapes.

* * * * *